Patented July 16, 1929.

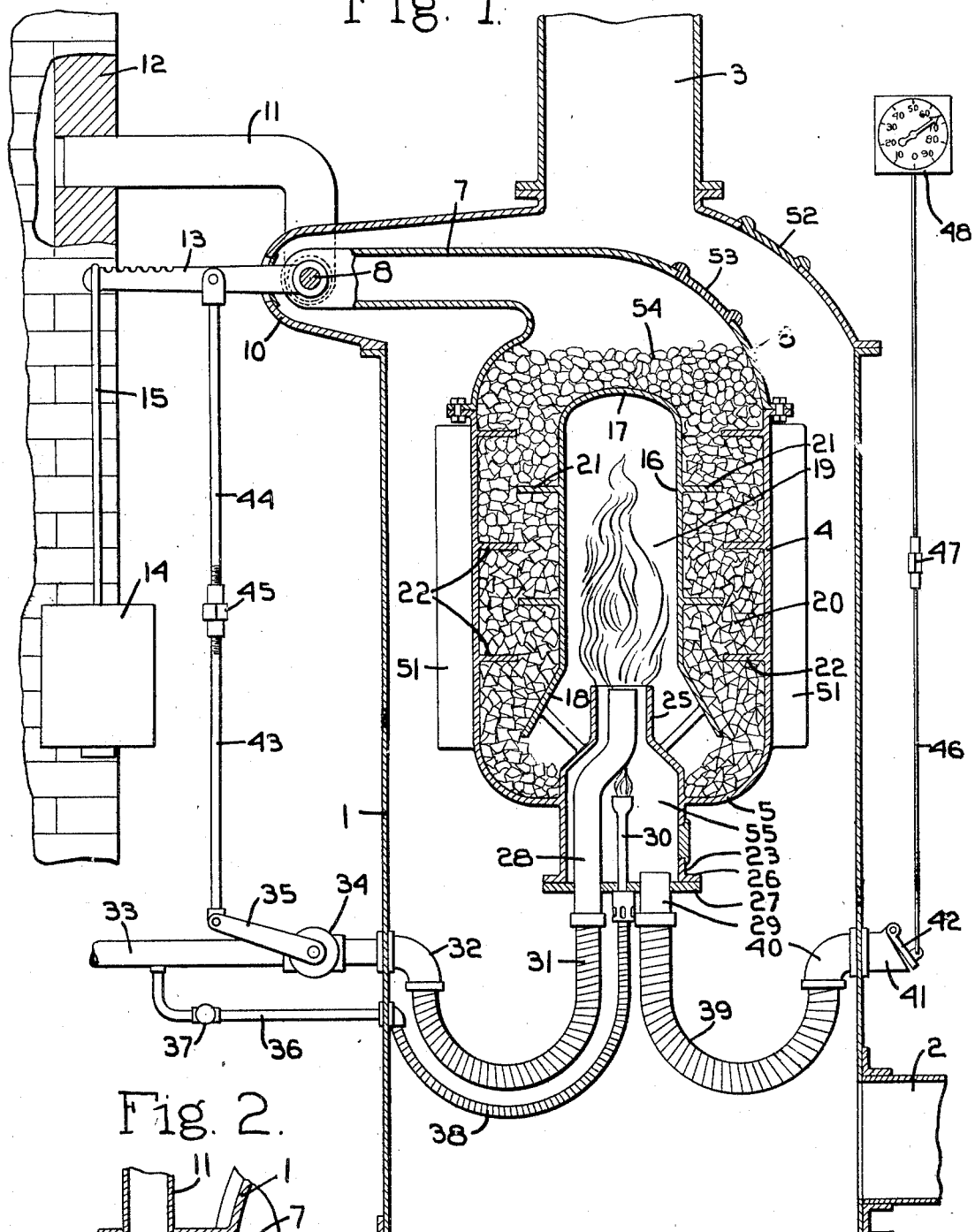
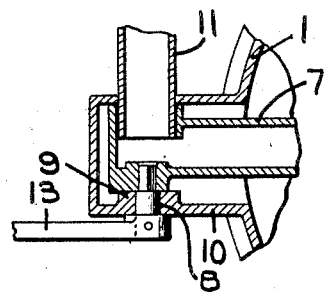

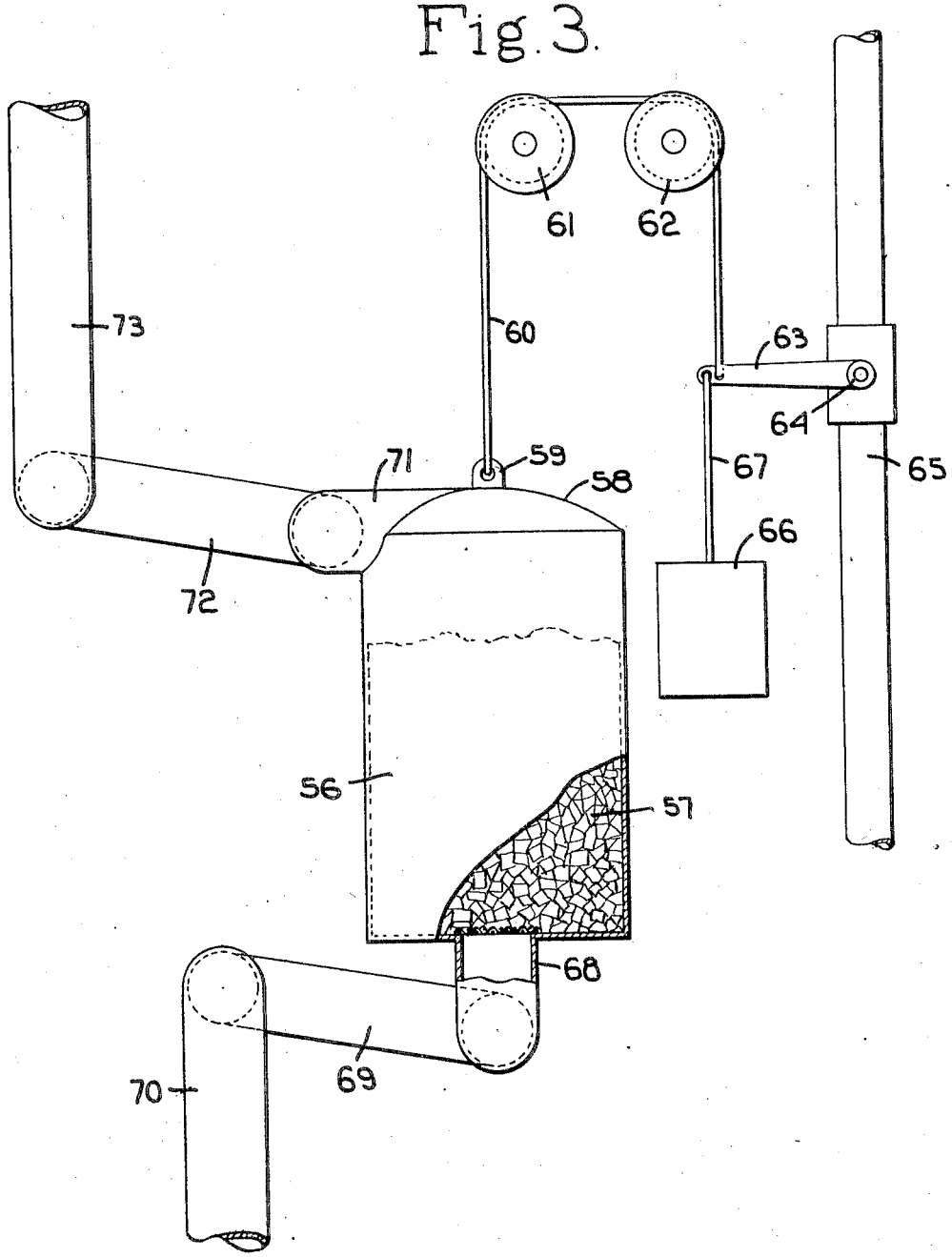

1,720,757

UNITED STATES PATENT OFFICE.

ARTHUR A. BLANCHARD, OF BROOKLINE, MASSACHUSETTS.

PROCESS AND APPARATUS FOR MAINTAINING COMPLETE COMBUSTION.

Application filed April 26, 1927. Serial No. 186,767.

This invention relates generally to processes and apparatus for producing and maintaining continuous combustion capable of utilizing all of the flammable gases or vapors of a fuel and all of the oxygen supplied to a combustion chamber to produce and maintain combustion therein.

In usual processes for producing combustion and in usual heating apparatus an excess of air is supplied to the fuel to insure a sufficient amount of oxygen to combine with all of the flammable contents of the fuel, for if an insufficient amount of oxygen is supplied, valuable constituents of the fuel are unconsumed. Where, however, such excess of air is provided the unused air passes out of the flue carrying with it a very considerable amount of heat. It is, therefore, uneconomical to supply either too little or too much air to the chamber in which combustion takes place.

The present invention contemplates the utilization of all of the flammable gases or vapors of a fuel and also all of the oxygen supplied to the combustion chamber or chambers.

If, in usual apparatus, a proper regulation for the air-fuel ratio is established for a given condition, such ratio will necessarily be varied if any other heating condition is desired, usually resulting in the supply either of an excess amount of fuel or of air.

The object of the invention is to provide a method and apparatus for automatically maintaining the exact air-fuel ratio required for complete combustion through a wide range of heating conditions.

A further object of the invention is to provide means automatically operable to control the output of heat produced by a heater of this type. In its broad sense the invention comprises the causing of combustion in a combustion chamber of a fuel with an agent containing free oxygen in the presence of an oxidizing material capable of giving off sufficient oxygen to maintain complete combustion of the fuel in temporary absence of sufficient free oxygen to maintain complete combustion and which oxidizing material has the properties of producing upon reduction a residue oxidizable by free oxygen supplied in excess of that required for complete combustion to reproduce said oxidizing material. In the present process and apparatus this reproduction of the oxidizing material is performed at substantially the temperature of combustion maintained within the combustion chamber.

In the present invention the variation in the weight of the oxidizing agent and its residue are utilized to vary the relative proportions of fuel and air supplied to the combustion chamber.

These and other objects and features of the invention will more fully appear from the following description and the accompanying drawings and will be particularly pointed out in the claims.

Preferred embodiments of the invention are illustrated in the accompanying drawings, in which, Fig. 1 is a view, mainly in vertical section, of a heating apparatus in which a vertically movable retort is mounted having primary and secondary combustion chambers, with suitable material in the secondary chamber to accomplish the purpose herein stated. Means are also illustrated for regulating the supply of fuel and air to the combustion chambers;

Fig. 2 is a detail view, mainly in horizontal section, showing the manner in which the retort is pivotally supported; and, Fig. 3 is a view, largely in diagrammatic form, showing a different embodiment of the invention.

The heating apparatus illustrated in Figs. 1 and 2 of the drawings comprises a preferably cylindrical outer drum 1 provided at its lower end with an air inlet 2 and at its upper end with a conduit 3 for the heated air which can be connected to usual radiators, or other heat-distributing means. The heating apparatus comprises a retort, which is yieldably supported within the drum 1 for purposes which will hereinafter more fully appear. The retort comprises an outer, preferably cylindrical wall 4 having a closed bottom 5 and a dome-shaped top 6 which may be formed separately from the wall 5 and which desirably is provided with an extension 7 forming a flue and which extension is secured to a short shaft 8 rotatably mounted in a boss 9 projecting inwardly from an extension 10 of the drum 1.

The extension 7 of the retort is provided with a lateral extension which is rotatably mounted upon the end of a flue 11 leading to the stack 12 which projects into the casing extension 10 in axial alinement with the shaft 8. A counterweighted arm 13, which is secured to the shaft 8, serves to support the retort yieldably within the casing 1 so that the retort may move substantially vertically within the casing in response to variations in the weight of said retort and its contents as will hereinafter more fully appear.

The counterweight 14 desirably is provided with a link 15 which is adjustable upon the arm 13 toward and from the axis of the pivotal shaft 8 so that a proper counterbalancing of the retort and its contents may be established. The retort is provided with an inner wall 16 which preferably is concentric with the outer wall 4 and provided with a preferably dome-shaped closed upper end 17. The lower end of the inner wall 16 desirably is flared outwardly to present a conoidal section 18 the periphery of the lower end of which lies in considerably closer proximity to the wall 4 than the main portion of the wall 16 and is spaced apart a considerable distance from the bottom 5 of the outer wall of the retort. The inner walls 16, 17 and 18 provide a central or primary combustion chamber 19 while the space between the walls provides a secondary combustion chamber 20 which communicates with the primary combustion chamber at its lower end so that the combustion which is commenced in the primary combustion chamber may be continued by the gases flowing through the space between the lower end of the conical wall 18 of the primary chamber and the bottom and side walls 5 of the secondary chamber during the ascent of the gases through the secondary chamber to the flue 7. Preferably the wall 16 of the primary chamber has upon its exterior laterally projecting baffles 21 and the outer wall 4 of the secondary chamber is provided with inwardly extending baffles 22 arranged in staggered relation with respect to the baffles 21 so that the gases flowing upwardly through the secondary chamber will take a sinuous course.

In the present invention the completion of combustion of the flammable gases and vapors of a fuel is caused to take place, preferably in a secondary chamber, in the presence of an oxidizing material capable of giving off sufficient oxygen to maintain complete combustion of the fuel in the temporary absence of sufficient oxygen to maintain such complete combustion. This oxidizing material is of such character as to produce upon reduction a residue capable of combining with the oxygen which is supplied to the combustion chamber in excess of that which is required to produce complete combustion and which when thus combined preferably will reproduce the original oxidizing material. Copper oxide is a material which will accomplish these purposes as it readily gives off oxygen to the fuel where the amount of free oxygen supplied is insufficient to produce complete combustion and in thus supplying oxygen to the fuel produces as a residue free copper which has an affinity for oxygen, particularly at the temperature which is maintained in the retort and which is, therefore, capable of absorbing oxygen which may be supplied to the combustion chamber in excess of that required to produce complete combustion. Other oxidizing agents or mixtures of oxidizing agents having the same characteristics may be employed.

Any suitable means may be provided for introducing gaseous fuel and air, or other agent containing free oxygen. In the preferred construction illustrated the bottom of the retort is provided with a burner comprising a preferably cylindrical wall 23 which fits and preferably is formed integrally with the base 5 of the retort and has a conical converging extension 24 projecting upwardly within the conical wall 18 of the primary chamber and terminating in a cylindrical nozzle 25, the end of which is located in proximity to the lower end of the cylindrical portion of the primary combustion chamber 19. The lower end of the cylindrical wall 23 of the burner is provided with an outwardly extending flange 26 to which is secured a plate or head 27 in which is mounted a gas-conducting nipple 28, an air-conducting nipple 29, and a pilot nipple 30. The gas-conducting nipple 28 extends into proximity to the upper end of the nozzle 25 of the burner. A flexible pipe or conduit 31 connects the lower end of the nipple 28 with an elbow 32 which extends through the wall 1 of the drum or casing and is connected to a fuel supply pipe 33. The fuel supply pipe 33 is provided with a valve 34 having a handle or operating lever 35. A branch pipe 36, having in it a valve 37, is connected at one end to a flexible pipe 38, the other end of which is connected to the lower end of the pilot nipple 30.

A flexible air pipe 39 is connected to the air nipple 29 which extends a short distance into the chamber of the burner 23 and the opposite end of the pipe 39 is connected to an elbow 40 which is mounted in and extends through the drum 1 and is provided with an extension 41 having a suitable valve 42 which is illustrated herein as a flap valve. Regulation of the relative proportions of fuel and air and of the total amount of fuel and air supplied to the combustion chamber is accomplished by means of the valves 34 and 42 which control respectively the gas and air supplied. One of these valves is regulable by variation in the weight of the retort and its contents and the other valve may be regulated by the temperature of the medium which is to be heated, or may be regulated manually. In view of the compensating action of the valves, as will hereinafter be more fully explained, either the fuel supply valve or the air valve may be subject to regulation by the movement of the retort and the other valve subject to thermostatic or manual regulation. In the construction illustrated in the drawings the lever 35 or handle of the valve 34 is adjustably connected by links 43 and 44 to the counterweighted arm 13 which balances the retort. Preferably the links 43 and 44 are connected together by a turnbuckle 45 so that the effective length of the linkage may be determined and a proper initial adjustment of the valve readily obtained.

As illustrated in the accompanying drawings the valve 42 is provided with a lug which is adjustably connected by a suitable rod or cable 46 having a turnbuckle 47, or other means of adjustment, with a suitable thermostatically operable device, having suitable means, such as an adjustable index, located above a suitable dial, for setting the thermostat at the temperature it is desired to maintain.

Desirably the exterior wall 24 of the retort is provided with a series of preferably vertically extending ribs or fins 51 to increase the effective radiating area of the retort. Suitable manholes 52 and 53 in the dome of the drum and of the retort may be provided to enable the oxidizing material to be introduced into the retort without dismantling the furnace.

The secondary combustion chamber of the retort desirably is filled substantially full with an oxidizing agent 54 of the character above described. Copper oxide in more or less granular form is found to be serviceable for this purpose although other oxidizing agents having the characteristics above defined may be employed.

In the operation of the device a pilot light is always maintained at the tip of the nipple 30. When it is desired to heat the furnace the valves of the fuel and air pipe are opened and gas and air permitted to enter the burner. The large chamber 55 at the base of the burner is of ample capacity to maintain a sufficient supply of air for the pilot light and also to permit the air to enclose the fuel nipple 28 which desirably is concentric with the nozzle 25.

The initial combustion is produced in the primary chamber 19 and inasmuch as the products of combustion and surplus fuel or oxygen can escape from the primary chamber only by passing through the secondary chamber further and complete combustion of any unconsumed essential constituents of the fuel will take place in the secondary chamber because of the presence of the oxidizing material in that chamber. The oxidizing material is of such character that all of the essential constituents of the fuel are consumed and only inert gases escape through the flue 7 of the retort. The reduction of the oxidizing material by the combination of the oxygen thereof with the fuel produces a residue which is lighter in weight than the oxidizing material. This reduction in weight of the contents of the retort causes the counterbalance 14 to raise the retort and its contents bodily. Inasmuch as the lever 35 of the gas valve 34 is connected to the counterweighted lever 13, the valve 34 is gradually shut off as the retort rises, thereby decreasing the supply of fuel. The throttling of the fuel supply will soon establish the exact fuel-air ratio in the combustion chambers. If, however, the supply of fuel is cut down to such an extent that there is an excess of air and consequently of oxygen present in the combustion chambers the residue from the oxidizing agent will combine with all of the surplus of oxygen which enters the secondary combustion chamber to reproduce the original oxidizing agent and will prevent the passage of any oxygen to the flue 7 of the retort. By proper initial adjustment of the valve 34 of the fuel pipe and of the valve 42, (and this may be accomplished without the use of the thermostatic mechanism), a condition may be established which will maintain at all times complete combustion of the fuel without the wastage of any fuel or of any oxygen so that the products of combustion which pass to the flue comprises only water vapor, nitrogen, carbon dioxide, and such other non-combustible constituents as may be contained in the fuel or air supplied.

The heat output of the furnace may be controlled manually, or, as illustrated herein, by thermostatic regulation of the position of the air valve 42, for it will be obvious that after proper setting of the air valve and fuel valve the automatic regulation of the air supplied by thermostatic means will cause a variation in the combustion of the secondary chamber which in turn will vary the weight of the retort and its contents, thereby producing a co-ordinated regulation of the fuel valve, so that when once a proper setting of the valves has been established for a predetermined output of heat from the furnace subsequent regulation of the heat output by the thermostat may be effected and by the automatic regulation of the fuel-air ratio a constant, complete combustion of all the essential elements of the fuel may be maintained and a complete consumption of all oxygen insured throughout the range of operation of the furnace.

While the apparatus heretofore described for performing the process comprises a retort having a primary combustion chamber and a secondary combustion chamber containing an oxidizing material adapted to insure completion of combustion with the retort movably mounted in such a manner that the movement thereof, caused by variation in the weight of the retort and its contents, may be utilized to control the air-fuel ratio, it will be readily understood that other types of apparatus may be employed in which the primary combustion may take place in a separate chamber, and the gases conducted from said chamber to a movable retort containing the oxidizing agent and forming a secondary combustion chamber, the movement of which, caused by variations of weight of the retort and its contents, may be employed to regulate the air-fuel ratio supplied to the primary combustion chamber.

In other words, the receptacle containing the oxidizing material may be distinct from, and located at a distance from, the primary combustion chamber. It will also be understood that the movable secondary combustion chamber, which acts as a regulator, need not necessarily receive all of the output of the primary chamber, but may be placed in a by-pass so as to receive only a predetermined fraction of the gases from the secondary chamber to enable it to function as a regulator.

Such a construction is somewhat diagrammatically illustrated in Fig. 3 of the drawings in which a retort 56, providing a secondary combustion chamber, contains a granular oxidizing agent 57. The retort is provided with a dome-shaped upper end 58 having a central lug presenting an eye 59 which is attached to one end of a cable 60 which passes over suitable sheaves 61 and 62 and is connected at its other end to the arm 63 of a valve 64 in a fuel supply pipe 65 leading to the burner of a heating apparatus (not shown).

A counterweight 66, which is connected by a cord 67 to the arm 63 of the valve, serves normally to counterbalance the weight of the retort 56 and its contents, and maintain the valve 64 in a predetermined position. Vertical movement of the retort 56, due to the variation in the weight of the retort, and its contents, will actuate the arm 63 to regulate the valve 64 in the fuel supply pipe in the manner heretofore described.

The retort is provided at its lower end with an inlet pipe 68 which is flexibly connected to a pipe 69 which in turn is flexibly connected to a pipe 70 through which the flue gases from the combustion chamber of the heating apparatus may be introduced, or which pipe 70 may constitute a by-pass adapted to carry a predetermined fraction of the gases from the combustion chamber. The retort is provided at its upper end with a lateral extension 71 which is connected by a flexible joint to a pipe 72 which extends in parallelism with the pipe 69 and is flexibly connected at its opposite end to a flue 72. In the operation of the device shown in this sketch the hot gases from the combustion chamber of the heating apparatus (not shown) enter the retort through the pipes 70, 69 and 68, and come into contact with the oxidizing material 57 in said retort. Any unconsumed fuel contained in such gases will be burned by the oxygen liberated by the oxidizing agent. The weight of the retort 56 and its contents will, therefore, be reduced and the retort raised by the counterweight 66, thus reducing the amount of fuel supplied. If unused air passes from the primary combustion chamber into the secondary combustion chamber within the retort 56, the oxygen of such unconsumed air will unite at once with the residue of the oxidizing agent, thereby increasing the weight of the retort and its contents, and causing the retort to descend, thereby actuating the valve 64 in the fuel supply pipe 65 which leads to the burner. Thus the amount of fuel supplied to a burner may be regulated by the movement of the retort providing a secondary chamber containing the oxidizing agent by virtue of the change of weight of the retort and the contents thereof.

It has heretofore been stated that the movement of the retort may not only be used to regulate the amount of fuel supplied to a combustion chamber, but may also be employed to regulate the air supplied thereto. It will be obvious that such regulation may be also accomplished by the embodiment of the invention disclosed in Fig. 3. While the regulating mechanism herein disclosed is shown as controlling the supply of liquid or gaseous fuel to the burner, it is obvious that suitable means may be provided for regulating an automatic stoker for supplying solid fuel to a furnace, or other heating apparatus.

It will further be understood that combustion may be caused to take place directly within a combustion chamber which also contains the oxidizing material, the variations in the weight of the chamber and its contents likewise being employed to regulate the air-fuel ratio as aforesaid, and that various other types of apparatus for performing the process herein disclosed may be employed, as the essence of the invention relates to the utilization of all of the fuel supplied to a combustion chamber containing an oxidizing agent of the character described, and the utilization of all of the oxygen in the air supplied to such combustion chamber, and the regulation of the air-fuel ratio by the variations in weight of the secondary chamber and its contents due to the reactions which take place in such combustion chamber.

It will be understood that the term "all"

as employed herein may not be strictly construed to mean one hundred per cent consumption of the fuel or gas, but substantially complete consumption thereof.

It will also be understood that the forms of apparatus shown and described herein are illustrative and that various changes in form, construction and arrangement of parts may be made within the scope of the invention, and that other forms of apparatus may be employed to perform the process herein described within the meaning and scope of the following claims.

Having thus described the invention, what is claimed as new, and desired to be secured by Letters Patent, is:

1. The process of maintaining complete combustion in a combustion chamber of the flammable gases or vapors of a fuel and the oxygen supplied to the combustion chamber irrespective of temporary variations in the amounts of either supplied, which comprises causing combustion of the flammable gases or vapors of said fuel with an agent containing free oxygen in the combustion chamber in the presence of an oxidizing material capable of giving off sufficient oxygen to maintain complete combustion of said flammable gases or vapors in the temporary absence of sufficient free oxygen to maintain said complete combustion and which oxidizing material produces upon reduction a residue oxidizable by free oxygen at substantially the temperature of such combustion to reproduce said oxidizing material.

2. The process of maintaining complete combustion in a combustion chamber of the flammable gases or vapors of a fuel and the oxygen supplied to the combustion chamber irrespective of temporary variations in the amounts of either supplied, which comprises causing combustion of the flammable gases or vapors of said fuel with an agent containing free oxygen in the combustion chamber in the presence of an oxidizing material capable of giving off sufficient oxygen to maintain complete combustion of said flammable gases or vapors in the temporary absence of sufficient free oxygen to maintain said complete combustion and which oxidizing material produces upon reduction a residue oxidizable by free oxygen supplied to said combustion chamber in excess of that required to maintain complete combustion to reproduce said oxidizing material.

3. The process of maintaining complete combustion in a combustion chamber of the flammable gases or vapors of a fuel and utilizing all the essential elements of said gases or vapors and all of the oxygen supplied to the combustion chamber irrespective of temporary variations in the amounts of either supplied, which comprises causing combustion of the flammable gases or vapors of the fuel in the presence of copper oxide.

4. The process of controlling the air-fuel ratio in combustion which comprises causing continuous combustion of the flammable gases or vapors of the fuel in a combustion chamber in the presence of an oxidizing material capable of giving off sufficient oxygen to maintain combustion of said flammable gases or vapors in the absence of sufficient free oxygen and which oxidizing material produces upon reduction a residue capable of combining with free oxygen temporarily supplied to said chamber in excess of that required for complete combustion to reproduce said oxidizing material and automatically varying the relative proportions of said oxygen and flammable gases or vapors of the fuel in correlation to the variation in weight of said oxidizing material.

5. The process of controlling the air-fuel ratio in combustion which comprises causing continuous combustion of the flammable gases or vapors of the fuel in a combustion chamber in the presence of a solid oxidizing material capable of giving off sufficient oxygen to maintain combustion of said flammable gases or vapors in the temporary absence of sufficient air to maintain complete combustion, the residue of which material is oxidizable at substantially the temperature of combustion by air supplied to said combustion chamber in excess of that required for complete combustion to reproduce said oxidizing material and automatically varying the relative proportions of air and flammable gases or vapors of the fuel in correlation to variations in the weight of said oxidizing material.

6. The process of controlling the air-fuel ratio in combustion of the flammable gases or vapors of a fuel which comprises causing continuous combustion of the flammable gases or vapors of the fuel in a combustion chamber in the presence of copper oxide and automatically varying the relative proportions of air and flammable gases or vapors of the fuel in correlation to the variations in the weight of said copper oxide and its product of reduction.

7. A device for controlling the air-fuel ratio in combustion of the flammable gases or vapors of a fuel comprising a combustion chamber, means for continuously introducing the flammable gases or vapors into said chamber, means for supplying air to said chamber, an oxidizing material in said chamber capable of temporarily supplying sufficient oxygen to insure complete combustion of said flammable gases or vapors in the absence of sufficient free oxygen in the air to cause complete combustion, which oxidizing material produces upon reduction a residue which will combine with unconsumed oxygen supplied by an excess of air admitted to said combustion chamber and means operable by the variations in weight of said oxidizing material and its product of reduction to vary the relative amounts of air and flammable gases or vapors of the fuel supplied to said combustion chamber.

8. A device for controlling the air-fuel ratio in combustion comprising a retort having a combination chamber, means for continuously introducing flammable gases or vapors of a fuel into said combustion chamber, means for supplying air to said chamber, a solid oxidizing material in said chamber capable of temporarily supplying sufficient oxygen to support complete combustion of said gaseous fuel and producing upon reduction a residue oxidizable by an excess of air admitted to said chamber to reproduce said oxidizing material, means yieldably supporting said oxidizing material to permit bodily movement thereof in response to variations in the weight of said material and means operable by such variations in weight to vary the relative amounts of flammable gases or vapors of the fuel and air supplied to said combustion chamber.

9. A device for controlling the air-fuel ratio in combustion comprising a retort having a combustion chamber, means for continuously introducing flammable gases or vapors of a fuel into said combustion chamber, means for supplying air to said chamber, a solid oxidizing material in said chamber capable of temporarily supplying sufficient oxygen to support complete combustion of said flammable gases or vapors of a fuel and producing upon reduction a residue oxidizable by an excess of air admitted to said chamber to reproduce said oxidizing material, means yieldably supporting said oxidizing material to permit bodily movement thereof in response to variations in the weight of said oxidizing material, means operable by such variations in weight to vary the relative amounts of flammable gases or vapors of the fuel and air supplied to said combustion chamber and thermostatic means co-operating with said regulating means to vary the total amount of flammable gases or vapors of the fuel and of the air supplied to said combustion chamber, whereby the amount of heat produced may be regulated.

10. A heating apparatus comprising a retort having a primary combustion chamber and a secondary combustion chamber communicating therewith, means for introducing gaseous fuel into said primary chamber, and means for admitting air into said primary chamber, means for delivering the products of combustion from said secondary chamber, a solid oxidizing agent in said secondary chamber capable of temporarily supplying sufficient oxygen to insure complete combustion of said gaseous fuel in the absence of sufficient free oxygen to maintain complete combustion and producing upon reduction a residue capable of combining with unconsumed oxygen supplied by an excess of air admitted, means yieldably supporting said oxidizing material and means operable by the movement of said material in response to variations in the weight thereof to regulate the relative amounts of gaseous fuel and air supplied to said combustion chambers.

11. A heating apparatus comprising a casing, a retort yieldably mounted within said casing having a central primary combustion chamber and a surrounding secondary combustion chamber communicating with said primary combustion chamber, conduits for flammable gases or vapors and for air leading to said primary combustion chamber, a solid oxidizing agent in said secondary chamber capable of temporarily supplying sufficient oxygen to maintain complete combustion of said flammable gases or vapors and producing upon reduction a residue oxidizable by unconsumed oxygen supplied by an excess of air, a valve in the conduit for supplying flammable gases and vapors, means connecting said valve to said retort operable by the movement of said retort in response to variations in the weight of said retort and its contents to regulate the amount of the flammable gases or vapors supplied to the combustion chambers.

12. A heating apparatus comprising a casing, a retort yieldably mounted within said casing having a primary combustion chamber and a secondary combustion chamber communicating with said primary combustion chamber, conduits for flammable gases or vapors and for air leading to said primary combustion chamber, a solid oxidizing agent in said secondary chamber capable of temporarily supplying sufficient oxygen to maintain complete combustion of said flammable gases or vapors and producing upon reduction a residue oxidizable by unconsumed oxygen supplied by an excess of air, a valve in the conduit for supplying said gases or vapors, means connecting said valve to said retort operable by the movement of said retort in response to variations in the weight of said retort and its contents to vary the amount of the flammable gases or vapors supplied to the combustion chambers, a valve in said air supply conduit and thermostatic means, subject to the temperature of the medium being heated, connected to said air pipe valve and operable to regulate the amount of air supplied, whereby the regulation of the respective amounts of flammable gases or vapors and of air supplied will control the output of heat produced by said heating apparatus.

13. A heating apparatus comprising a casing, a retort yieldably supported in said casing having inner and outer concentric walls forming an inner primary combustion chamber and an outer secondary combustion chamber communicating with said primary combustion chamber at its lower end, means for delivering the products of combustion from the upper end of said secondary combustion chamber, baffles extending alternately from the inner and outer walls of the secondary combustion chamber, conduits for flammable gases or vapors, and for air respectively leading to said inner combustion chamber, a solid oxidizing material in said secondary chamber capable of temporarily supplying sufficient oxygen to maintain complete combustion of said flammable gases or vapors and producing upon reduction a residue capable of combining with unconsumed oxygen supplied to said secondary chamber in excess of the amount required for complete combustion of the flammable gases or vapors and means operable by the yielding movement of said retort caused by variations in weight of said retort and its contents to vary the relative amounts of flammable gases or vapors and air supplied to said combustion chambers.

14. A heating apparatus comprising a casing, a retort within said casing having an inner wall providing a primary combustion chamber and an outer wall concentric therewith and spaced apart therefrom providing a secondary combustion chamber, said outer wall having at its upper end an extension forming a flue and pivotally mounted upon said casing, an arm extending from said retort provided with an adjustable counter-weight, conduits for flammable gases or vapors and for air respectively leading to said primary combustion chamber, valves in the respective conduits, and means adjustably connecting said counterweighted arm to the valve in the conduit for flammable gases or vapors operable by the movement of said retort upon variations in the weight of the retort and its contents to control the amount of flammable gases or vapors supplied, and an oxidizing agent in said secondary combustion chamber capable of temporarily supplying sufficient oxygen to insure complete combustion of said flammable gases or vapors and producing upon reduction a residue capable of combining with the oxygen supplied by an excess of air admitted to said combustion chambers.

15. A heating apparatus comprising a casing, a retort within said casing having an inner wall providing a primary combustion chamber and an outer wall concentric therewith and spaced apart therefrom providing a secondary combustion chamber, said outer wall having at its upper end an extension forming a flue and pivotally mounted upon said casing, an arm extending from said retort provided with an adjustable counter-weight, conduits for flammable gases or vapors and for air respectively leading to said primary combustion chamber, valves in the respective conduits, and means adjustably connecting said counterweighted arm to the valve in the conduit for flammable gases or vapors operable by the movement of said retort upon variations in the weight of the retort and its contents to control the amount of flammable gases or vapors supplied, an oxidizing agent in said secondary combustion chamber capable of temporarily supplying sufficient oxygen to insure complete combustion of said flammable gases or vapors and producing upon reduction a residue capable of combining with the oxygen supplied by an excess of air admitted to said combustion chambers, and thermostatic means, subject to the temperature of the medium to be heated, connected to the valve in the air conduit to control the amount of air supplied, whereby the respective regulations of the supply of flammable gases or vapors and air will co-operate to control the output of heat produced by said heating apparatus.

16. A device for controlling the air-fuel ratio in combustion comprising a combustion chamber, a yieldably mounted retort having an inner wall providing a primary combustion chamber and a surrounding secondary chamber, means for passing the hot flammable gases or vapors from said combustion chamber into said secondary chamber, an oxidizing material in said secondary chamber capable of temporarily supplying sufficient oxygen to consume all the fuel in said flammable gases or vapors and producing upon reduction a residue capable of combining with unconsumed oxygen supplied in excess of the amount required for complete consumption of the said flammable gases or vapors and means operable by the movement of said retort caused by variations in weight of said retort and its contents to vary the relative amounts of air and flammable gases or vapors supplied to the combustion chamber.

17. The process of maintaining complete combustion of flammable gases or vapors of a fuel in an enclosure which comprises causing combustion in air supplied to said enclosure in the presence of a mass of an oxidizing material reducible by an excess of flammable gases or vapors over that required to combine with all the oxygen of the air supplied to said enclosure and when so reduced oxidizable by an excess of air thereafter supplied to said enclosure and utilizing the variations in weight of said mass so to vary the ratio of fuel and air supplied to said combustion chamber to maintain complete combustion of said flammable gases or vapors.

18. The process of maintaining complete combustion of flammable gases or vapors of a fuel in a combustion chamber having a supply of air which comprises causing combustion in the presence of a mass of an oxidizing material reducible by an excess of flammable gases or vapors over that required to combine with all the oxygen of the air supplied to said combustion chamber, to cause complete combustion of the flammable gases or vapors and utilizing the variations in the weight of said mass to regulate the amount of flammable gases or vapors to maintain complete combustion thereof.

In testimony whereof, I have signed my name to this specification.

ARTHUR A. BLANCHARD